United States Patent
Grünbeck

(10) Patent No.: US 11,092,059 B2
(45) Date of Patent: Aug. 17, 2021

(54) METHOD AND DEVICE FOR MONITORING AN SCR EXHAUST GAS AFTER-TREATMENT DEVICE

(71) Applicant: MAN Truck & Bus AG, Munich (DE)

(72) Inventor: Thomas Grünbeck, Nuremberg (DE)

(73) Assignee: MAN TRUCK & BUS AG, Munich (DE)

( * ) Notice: Subject to any disclaimer, the term of this patent is extended or adjusted under 35 U.S.C. 154(b) by 85 days.

(21) Appl. No.: 16/361,554

(22) Filed: Mar. 22, 2019

(65) Prior Publication Data

US 2019/0292968 A1   Sep. 26, 2019

(30) Foreign Application Priority Data

Mar. 23, 2018   (DE) ..................... 10 2018 106 952.9

(51) Int. Cl.
| | |
|---|---|
| *F01N 3/00* | (2006.01) |
| *F01N 11/00* | (2006.01) |
| *B01D 53/94* | (2006.01) |
| *F01N 3/20* | (2006.01) |

(52) U.S. Cl.
CPC .......... *F01N 11/00* (2013.01); *B01D 53/9418* (2013.01); *F01N 3/208* (2013.01); *F01N 3/2066* (2013.01); *F01N 2550/02* (2013.01); *F01N 2560/021* (2013.01); *F01N 2560/14* (2013.01); *F01N 2570/14* (2013.01); *F01N 2570/18* (2013.01); *F01N 2610/02* (2013.01); *F01N 2900/1616* (2013.01)

(58) Field of Classification Search
CPC ........ F01N 3/208; F01N 11/00; F01N 3/2066; F01N 2560/021; B01D 53/9418
USPC ........................................................... 60/277
See application file for complete search history.

(56) References Cited

U.S. PATENT DOCUMENTS

| | | | | |
|---|---|---|---|---|
| 2005/0282285 | A1 | 12/2005 | Radhamohan et al. | |
| 2008/0184775 | A1* | 8/2008 | Yamagishi | G01N 27/185 73/25.05 |
| 2011/0083424 | A1* | 4/2011 | Wang | F01N 3/208 60/277 |
| 2012/0111870 | A1* | 5/2012 | Hodgson | G01F 23/268 220/562 |

(Continued)

FOREIGN PATENT DOCUMENTS

| | | |
|---|---|---|
| DE | 102010026373 A1 | 3/2011 |
| DE | 112014005463 | 8/2016 |

(Continued)

*Primary Examiner* — Jason D Shanske
(74) *Attorney, Agent, or Firm* — Weber Rosselli & Cannon LLP

(57) ABSTRACT

The present disclosure relates to a device and a method for monitoring an SCR exhaust gas after-treatment device. The method involves monitoring of a ratio between reducing agent quantity and nitrogen oxide conversion, especially a ratio between ammonia quantity and nitrogen oxide conversion, of the SCR exhaust gas after-treatment device. The nitrogen oxide conversion is detected or determined with a cross sensitivity to ammonia. The method furthermore involves determining of an ammonia slip condition based on the monitored ratio between reducing agent quantity and nitrogen oxide conversion. The method may offer the benefit of being easily carried out and implemented in an easy manner.

17 Claims, 1 Drawing Sheet

(56) References Cited

U.S. PATENT DOCUMENTS

| | | | | |
|---|---|---|---|---|
| 2012/0255282 | A1* | 10/2012 | Nagata | F01N 3/208 60/274 |
| 2013/0255233 | A1* | 10/2013 | Yasui | F01N 3/10 60/286 |
| 2014/0056790 | A1* | 2/2014 | Geveci | B01D 53/9495 423/212 |
| 2015/0209730 | A1* | 7/2015 | Blanckenfiell | F01N 11/00 436/108 |
| 2015/0218993 | A1* | 8/2015 | Chavannavar | F01N 3/208 423/239.1 |
| 2015/0226102 | A1* | 8/2015 | Hsieh | B01D 53/9418 60/274 |
| 2016/0326935 | A1* | 11/2016 | Lundberg | F01N 9/005 |
| 2017/0051654 | A1 | 2/2017 | Gupta et al. | |
| 2017/0306827 | A1 | 10/2017 | Wu et al. | |
| 2017/0350291 | A1* | 12/2017 | Khaled | F01N 13/008 |
| 2018/0221819 | A1* | 8/2018 | Nilsson | B01D 53/9477 |
| 2018/0320576 | A1* | 11/2018 | Butler | F01N 3/2066 |
| 2019/0003362 | A1* | 1/2019 | Sundar | F01N 3/106 |

FOREIGN PATENT DOCUMENTS

| | | |
|---|---|---|
| DE | 112014007113 | 8/2017 |
| DE | 102016209533 A1 | 12/2017 |
| EP | 2734718 B1 | 9/2015 |
| EP | 3139013 A1 | 3/2017 |
| WO | 2010065963 A2 | 6/2010 |
| WO | 2011112985 A1 | 9/2011 |
| WO | 2013147653 A1 | 10/2013 |
| WO | 2015092225 A1 | 6/2015 |
| WO | 2015095332 A1 | 6/2015 |
| WO | 2016018886 A1 | 2/2016 |

\* cited by examiner

METHOD AND DEVICE FOR MONITORING AN SCR EXHAUST GAS AFTER-TREATMENT DEVICE

BACKGROUND

The disclosure relates to a method and a device for monitoring an SCR exhaust gas after-treatment device in regard to the occurrence of an ammonia slip condition.

So-called SCR exhaust gas after-treatment devices can be employed for the reduction of nitrogen oxides in exhaust gases of internal combustion engines, for example. In an SCR exhaust gas after-treatment device, an aqueous urea solution is typically injected into the exhaust gas stream. From the aqueous urea solution, ammonia and $CO_2$ can be formed by a hydrolysis reaction. The ammonia can react in an SCR catalyst of the SCR exhaust gas after-treatment device with the nitrogen oxides present in the exhaust gas to reduce the nitrogen oxides. In particular, diatomic nitrogen and water can be formed in this way.

The aqueous urea solution needs to be dispensed in a way such that no excess ammonia dosage occurs. Excess ammonia dosage may result in so-called ammonia slip, in which case ammonia is further carried downstream from the SCR catalyst in the exhaust gas.

US 2017/0306827 A1 discloses a system consisting of an exhaust system with a catalyst for selective catalytic reduction (SCR) and a control system. An ammonia-to-NOx ratio value (ANR value) is determined for the exhaust gas flowing through the exhaust system. An $NH_3$ slip value, referring to an $NH_3$ slip through the exhaust system behind the SCR catalyst, is determined by means of an $NH_3$ sensor downstream from the SCR catalyst.

US 2005/0282285 A1 discloses a method for controlling the supply rate of ammonia to an SCR catalyst, consisting of adjusting an ammonia supply rate and providing a discrete pulse in the ammonia supply rate. An output from a NOx sensor behind the SCR catalyst is analyzed to determine whether an ammonia slip is occurring.

WO 2011/112985 A1 discloses a method intended for the operation of an SCR after-treatment system at a series of operating points with reduced ammonia-to-NOx ratio (ANR). The method further involves the determination of a DeNOx efficiency, corresponding to each of the ANR operating points. The method further involves the determination of a reducing correction value as a reaction to the DeNOx efficiency values corresponding to each of the ANR operating points, and the provision of a reducing injection command as a reaction to the reducing correction value.

Further related methods are known, e.g., from WO2016/018886 A1, DE 11 2014 005 463 T5, WO 2015/092225 A1, WO 2015/095332 A1 and EP 2 734 718 B1.

The problem which the disclosure proposes to solve is to provide an alternative and/or improved method for the monitoring of an SCR exhaust gas after-treatment device. In particular, it should become possible to easily determine an ammonia slip condition. In particular, one problem to be solved is to recognize whether a value measured by a nitrogen oxide sensor having a cross sensitivity to ammonia also contains ammonia fractions.

SUMMARY

The method serves for the monitoring of an SCR exhaust gas after-treatment device. The method involves monitoring of a ratio between reducing agent quantity and nitrogen oxide conversion, especially a ratio between ammonia quantity and nitrogen oxide conversion (e.g., ANR, or ammonia-to-NOx ratio, value), of the SCR exhaust gas after-treatment device. The nitrogen oxide conversion is detected or determined with a cross sensitivity to ammonia.

The method further involves determining of an ammonia slip condition based on the monitored ratio between reducing agent quantity and nitrogen oxide conversion.

Since the nitrogen oxide conversion is determined with a cross sensitivity to ammonia, it can be recognized that ammonia slip is occurring in the event of an abnormal ratio, especially too large a ratio, between the reducing agent quantity and the nitrogen oxide conversion. The method is simple to carry out and can be implemented in an easy manner, since it expediently requires only the parameters of the reducing agent quantity and the nitrogen oxide conversion to carry out the monitoring. Hence, little or no additional apparatus is needed to carry out the method. Owing to the simplicity of the method, it is also relatively robust.

If ammonia slip is occurring, the detected or determined nitrogen oxide conversion, which appears as the divisor in the ratio between the reducing agent quantity and the nitrogen oxide conversion, becomes smaller or relatively small, especially in a short time, on account of the cross sensitivity to ammonia. As a result, the ratio between the reducing agent quantity and the nitrogen oxide conversion may become relatively large or larger, especially in a short time. This abnormal behaviour can be recognized during the monitoring and be identified as ammonia slip.

In addition, the present method prevents more reducing agent from being added when ammonia slip is occurring, since the detected or determined nitrogen oxide conversion wrongly indicates too low a nitrogen oxide conversion on account of the cross sensitivity to ammonia, which would normally be responded to with an increase in the reducing agent quantity.

In particular, the determination of an ammonia slip condition can be based solely on the monitored ratio between the reducing agent quantity and the nitrogen oxide conversion. It is also possible to bring in further operating parameters of the internal combustion engine and/or the SCR exhaust gas after-treatment device, for example in order to rule out attributing the change in the monitored ratio between the reducing agent quantity and the nitrogen oxide conversion to altered operating parameters (for example, increased exhaust gas quantity, increased reducing agent quantity, and so forth).

Expediently, the term "reducing agent" used herein may refer, e.g., to a fluid (e.g., aqueous urea solution) that can be injected into the exhaust gas for the reduction of nitrogen oxides, to an ingredient (such as urea) present in the fluid, and/or to ammonia which can form from the fluid, e.g., after the injection.

It is possible for the nitrogen oxide conversion to result as a difference between a first nitrogen oxide value of the exhaust gas upstream from an SCR catalyst and a second nitrogen oxide value of the exhaust gas downstream from the SCR catalyst, the second nitrogen oxide value being detected with a cross sensitivity to ammonia.

In particular, the reducing agent quantity and the nitrogen oxide conversion can be related to the same period of time, so that it can be detected which reducing agent quantity has resulted in which nitrogen oxide conversion with the monitored ratio between the reducing agent quantity and the nitrogen oxide conversion.

As used herein, the abbreviation "SCR", as in SCR catalyst and SCR exhaust gas after-treatment device, refers to a selective catalytic reduction.

It should be recognized that, even though the terms nitrogen oxide, nitrogen oxide value, nitrogen oxide sensor, nitrogen oxide content, nitrogen oxide fraction, nitrogen oxide conversion, etc., are used herein, these may refer to a combination of nitrogen oxide and ammonia, especially if ammonia slip occurs, because of a cross sensitivity to ammonia.

Expediently, the ratio between the reducing agent quantity and the nitrogen oxide conversion can be permanently monitored during the operation of the SCR exhaust gas after-treatment device.

In one exemplary embodiment, an ammonia slip condition is determined if the ratio between the reducing agent quantity and the nitrogen oxide conversion is outside a permissible range, especially a predetermined range. Alternatively or additionally, an ammonia slip condition is determined if the ratio between the reducing agent quantity and the nitrogen oxide conversion is outside a permissible range, especially a predetermined range, for a predetermined time. The permissible range and/or the period of time may be predetermined and stored for example in a monitor device. Taking into account the period of time prevents temporary outliers and measurement errors from resulting in the wrong finding of an ammonia slip condition.

In a further exemplary embodiment, an ammonia slip condition is determined if the ratio between the reducing agent quantity and the nitrogen oxide conversion is greater than a predetermined limit value. Alternatively or additionally, an ammonia slip condition is determined if the ratio between the reducing agent quantity and the nitrogen oxide conversion is greater than a predetermined limit value for a predetermined time. The limit value and/or the period of time may be predetermined and stored for example in a monitor device. Taking into account the period of time prevents temporary outliers and measurement errors from resulting in the wrong finding of an ammonia slip condition.

It is also possible to use the nitrogen oxide conversion and/or the nitrogen oxide values used to determine the nitrogen oxide conversion as mean values of several measurements, especially measurements conducted in succession.

In a further exemplary embodiment, the method involves determination or estimation of an ammonia slip quantity based on the monitored ratio between the reducing agent quantity and the nitrogen oxide conversion. For example, the ammonia slip quantity can be determined or estimated as greater as the monitored ratio between the reducing agent quantity and the nitrogen oxide conversion is greater. For example, empirically determined data can be used for this in the form of tables, formulae, and so on. The estimation of the ammonia slip quantity can be used to institute suitable adapted countermeasures.

In one embodiment, the reducing agent quantity, especially the ammonia quantity, is detected or determined based on a detection of a composition of a fluid supplied or being supplied to a reducing agent injector for the injection, especially an aqueous urea solution.

In one modification, a water fraction, a water content, a urea fraction and/or a urea content of the fluid are/is detected. For example, it can be determined on the basis of a detection of a urea fraction in the fluid how much ammonia can be formed in this way. It is also possible to detect for example a water fraction and to infer a urea fraction (e.g., 1—water fraction).

In a further embodiment, the detection of the composition occurs in a fluid tank, especially for an aqueous urea solution.

In one variant embodiment, the reducing agent quantity, especially the ammonia quantity, is detected or determined based on a detection of a fluid quantity of a fluid supplied to or injected into a reducing agent injector for the injection, especially an aqueous urea solution.

In one modification, the detection of the fluid quantity is done by means of detection of an operating parameter of a fluid pump (e.g., an aqueous urea solution pump), by means of detection of an operating parameter of a reducing agent injector, by means of a flow rate sensor (e.g., aqueous urea solution flow rate sensor) and/or by means of a fill level sensor of a fluid tank (e.g., aqueous urea solution tank).

For example, the fluid tank may stand in fluidic connection via the fluid pump with the reducing agent injector. It is possible for the flow rate sensor to be arranged somewhere in or at the fluid connection between the fluid tank and the reducing agent injector.

In particular, the reducing agent quantity can result from a combination of a detection of the fluid quantity and a detection of the composition of the fluid.

In one variant embodiment, the reducing agent quantity, especially the ammonia quantity, is determined (e.g., calculated) based on a pump speed of a fluid pump, a delivery pressure of the fluid pump and an opening time of a reducing agent injector.

In one exemplary embodiment, the method moreover involves (physical or virtual, for example) detecting of a first nitrogen oxide value (for example, nitrogen oxide content, nitrogen oxide quantity, etc. in the exhaust gas) upstream from an SCR catalyst of the SCR exhaust gas after-treatment device. Alternatively or additionally, the method moreover involves (physical, for example) detecting of a second nitrogen oxide value (for example, nitrogen oxide content, nitrogen oxide quantity, etc. in the exhaust gas) downstream from the SCR catalyst, which is detected with a cross sensitivity to ammonia. Alternatively or additionally, the method involves determining of the nitrogen oxide conversion as the difference between the first nitrogen oxide value and the second nitrogen oxide value.

In a further exemplary embodiment, the method involves introducing of measures to lessen an ammonia slip if the ammonia slip condition has been determined. Alternatively or additionally, injected reducing agent quantity or a quantity about to be injected may be decreased, for example, if the ammonia slip condition has been determined.

The disclosure is also focused on a device for exhaust gas after-treatment, especially an SCR exhaust gas after-treatment device. The device comprises a reducing agent injector and an SCR catalyst, which is arranged downstream from the reducing agent injector. The device comprises a monitor device, which is designed to carry out the method as disclosed herein. The device offers the same benefits as the method disclosed herein.

In one exemplary embodiment, the device comprises a first nitrogen oxide sensor (such as a physical nitrogen oxide sensor or virtual nitrogen oxide sensor), situated upstream from the SCR catalyst and detecting a first nitrogen oxide value. Alternatively or additionally, the device comprises a second nitrogen oxide sensor (such as a physical nitrogen oxide sensor), situated downstream from the SCR catalyst and detecting a second nitrogen oxide value, especially with a cross sensitivity to ammonia. It is possible for the monitor device to determine the nitrogen oxide conversion as the difference between the first nitrogen oxide value and the second nitrogen oxide value.

In a further exemplary embodiment, the device comprises a first fluid sensor for detecting a composition of a fluid supplied or to be supplied to the reducing agent injector for the injection. Alternatively or additionally, the device comprises a (second) fluid sensor (such as a fluid tank fill level sensor, a fluid flow rate sensor) and/or a fluid pump for detecting a fluid quantity of a fluid supplied or to be supplied to the reducing agent injector for the injection. It is possible for the monitor device to determine the reducing agent quantity, especially the ammonia quantity, based on the detected composition and the detected fluid quantity. It is also possible for the monitor device to determine the reducing agent quantity, especially the ammonia quantity, based on a predetermined composition of the fluid and the detected fluid quantity.

Expediently, the monitor device stands in communication with the first nitrogen oxide sensor, the second nitrogen oxide sensor, the first fluid sensor, the second fluid sensor, the fluid pump and/or the reducing agent injector.

The disclosure also focuses on a motor vehicle, especially a utility vehicle (such as lorry or bus), having a device as disclosed herein.

It is also possible to use the device and the method as disclosed herein for passenger cars, large motors, all-terrain vehicles, stationary motors, marine motors, in-furnace installations, refuse incinerators, gas turbines, industrial installations, and so forth.

Expediently, the terms upstream and downstream used herein refer to a direction of an exhaust gas stream in an exhaust gas duct. For example, if a component A is located upstream from a component B, the exhaust gas can first reach component A and only afterward component B.

Expediently, the term ammonia slip may refer to a situation in which ammonia is present in the exhaust gas downstream from an SCR catalyst.

BRIEF DESCRIPTION OF THE DRAWINGS

The embodiments and features of the present disclosure may be combined with each other in any way desired. Further features and benefits will be described in the following with reference to the enclosed drawings. There are shown.

DETAILED DESCRIPTION

Figure 1:
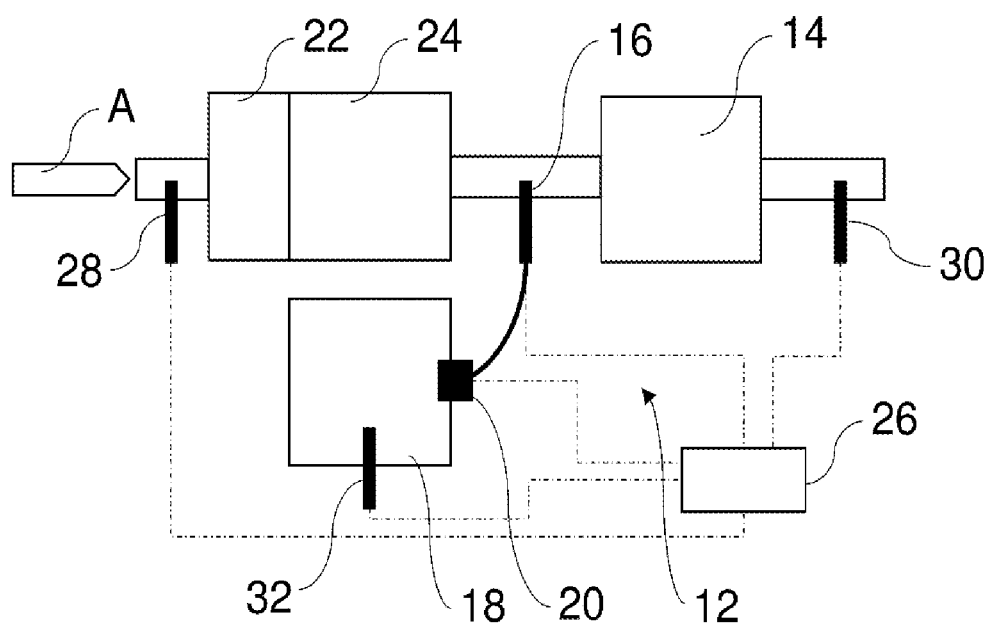
FIG. 1 a schematic representation of an exhaust gas after-treatment system with an SCR exhaust gas after-treatment device.
Figure 2:
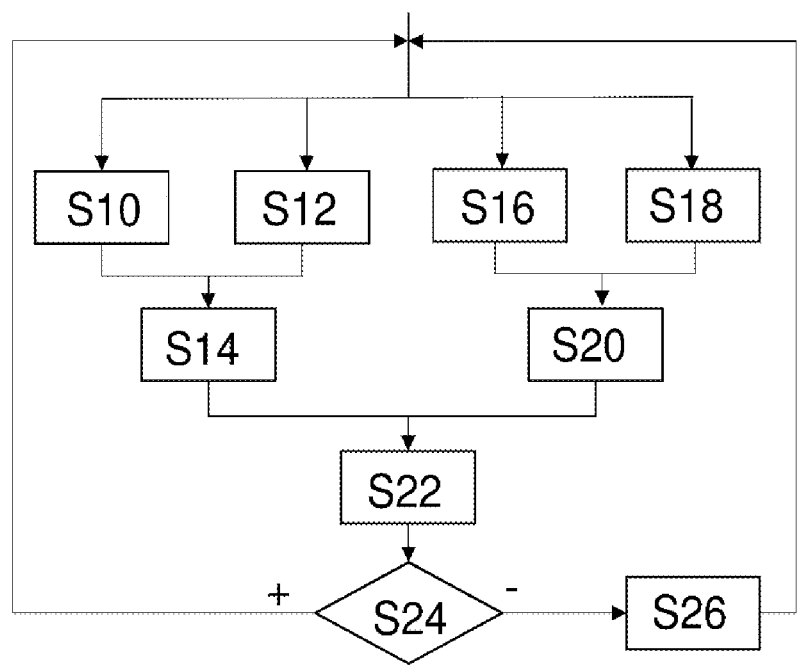
FIG. 2 a flow chart of a method for monitoring an SCR exhaust gas after-treatment device according to the present disclosure.

FIG. 1 shows an exhaust gas after-treatment system 10. The exhaust gas after-treatment system 10 serves for the treatment of exhaust gas of an internal combustion engine. For this, exhaust gas (arrow A) flows through the exhaust gas after-treatment system 10. The exhaust gas after-treatment system 10 may be comprised in a motor vehicle, especially a utility vehicle. The utility vehicle may be for example a lorry or a bus. The exhaust gas after-treatment system 10 can be situated in particular downstream from an internal combustion engine of the motor vehicle.

The exhaust gas after-treatment system 10 comprises an SCR exhaust gas after-treatment device 12. The SCR exhaust gas after-treatment device 12 serves for the reducing of nitrogen oxides (NOx) in the exhaust gas. The SCR exhaust gas after-treatment device 12 comprises an SCR catalyst 14 and a reducing agent injector (fluid injector) 16. The reducing agent injector 16 stands in fluidic connection with a fluid tank 18. The fluid tank 18 is filled with a fluid, such as an aqueous urea solution. A fluid pump 20 can deliver the fluid from the fluid tank 18 to the reducing agent injector 16. The reducing agent injector 16 can inject or dispense the fluid into an exhaust gas pipe region upstream from the SCR catalyst 14. In the hot exhaust gas stream, ammonia can form from the injected aqueous urea solution, which is used to reduce the nitrogen oxides in the region of the SCR catalyst 14 by selective catalytic reduction. It is also possible to use additional hydrolysis catalysts.

The exhaust gas after-treatment system 10 may have further exhaust gas after-treatment devices. For example, the exhaust gas after-treatment system 10 may comprise an oxidation catalyst (for example, a diesel oxidation catalyst) 22 and a particle filter (for example, a diesel particle filter) 24. The oxidation catalyst 22 and the particle filter 24 may be situated for example upstream from the SCR catalyst 14 and/or the reducing agent injector 16. It is also possible for the exhaust gas after-treatment system 10 to comprise, for example, an ammonia oxidation catalyst (not shown) downstream from the SCR catalyst 14. In event of an ammonia slip, the ammonia oxidation catalyst can convert excessively dispensed ammonia into nitrogen and water. The ammonia oxidation catalyst can also generate NOx once more, which can then be detected by means of a nitrogen oxide sensor (e.g., the nitrogen oxide sensor 30). The function of the ammonia oxidation catalyst may depend on the operating point (e.g., temperature, exhaust gas mass flow). It is possible that the ammonia oxidation catalyst will not be able to convert the entire ammonia quantity into nitrogen and water if the ammonia slip is too large.

Moreover, a monitor device 26 is provided for monitoring the SCR exhaust gas after-treatment device 12. The monitor device 26 can be provided, for example, as a separate monitor device or be integrated in a control system of the SCR exhaust gas after-treatment device 12. The monitor device 26 may stand in communication with various sensors, so that in particular it is possible for the monitor device 26 to determine a ratio between reducing agent quantity and nitrogen oxide conversion.

For example, the monitor device 26 may be connected in communication with a first nitrogen oxide sensor 28. The first nitrogen oxide sensor 28 may be situated upstream from the reducing agent injector 16 and the SCR catalyst 14. For example, the first nitrogen oxide sensor 28 may also be situated upstream from the oxidation catalyst 22 and the particle filter 24. The first nitrogen oxide sensor 28 can measure a first nitrogen oxide value, for example a nitrogen oxide content or a nitrogen oxide fraction in the exhaust gas flowing upstream from the reducing agent injector 16 and the SCR catalyst 14. The first nitrogen oxide sensor 28 can put out a corresponding signal to the monitor device 26. It is possible for the first nitrogen oxide sensor 28 to be cross sensitive to ammonia. It is also possible for the first nitrogen oxide sensor 28 to be a physical sensor or a virtual sensor. As a virtual sensor, for example a model can be provided which calculates the nitrogen oxide emissions based on detected or known operating parameters, e.g., those of the internal combustion engine.

Moreover, the monitor device 26 may be connected in communication with a second nitrogen oxide sensor 30. The second nitrogen oxide sensor 30 may be situated downstream from the SCR catalyst 14. Like the first nitrogen oxide sensor 28, the second nitrogen oxide sensor 30 can be designed to measure a second nitrogen oxide value, for example a nitrogen oxide content or a nitrogen oxide fraction, in the exhaust gas flowing downstream from the SCR catalyst 14. The second nitrogen oxide sensor 30 may have a cross sensitivity to ammonia. For example, the second nitrogen oxide sensor 30 may be cross sensitive to ammonia such that 3/3-4/3 $NH_3$ molecules (ammonia molecules) can be measured for each NOx molecule measured, especially in dependence on the ratio of NO and $NO_2$. This may have the result that the nitrogen oxide value measured by the second nitrogen oxide sensor 30 is in fact a combined value of measured nitrogen oxide and ammonia when ammonia slip is occurring. Expediently, the second nitrogen oxide sensor 30 may be a physical sensor.

The monitor device 26 can moreover be designed to detect or determine a reducing agent quantity injected by the reducing agent injector 16. For this, the monitor device 26 may stand in communication with the fluid pump 20, for example. The fluid pump 20 may expediently send an operating parameter (e.g., electric power taken up) to the monitor device 26, indicating a quantity of fluid delivered to the reducing agent injector 16. It is also possible to take into account any leakage flows occurring. There may also be provided a separate fluid sensor, which directly or indirectly detects the delivered quantity. For example, a flow rate sensor may be provided in a fluidic connection between the fluid pump 20 and the reducing agent injector 16. Alternatively or additionally, the monitor device 26 may detect the delivered quantity by means of a fill level sensor (not shown), which detects a fill level of the fluid tank 18. In addition, the monitor device 26 may be connected to a further fluid sensor 32. The further fluid sensor 32 can detect a quality of the fluid in the fluid tank 18 and put this out as a corresponding signal. For example, the further fluid sensor 32 may detect a urea fraction, a urea content, a water fraction and/or a water content of an aqueous urea solution in the fluid tank 18. It is also possible for no further fluid sensor 32 to be needed, since only a standardized urea solution with for example 32.5% pure urea in demineralised water is used.

In the following, an exemplary method for the monitoring of an SCR exhaust gas after-treatment device is described, making reference to the exemplary components of the SCR exhaust gas after-treatment device 12 of FIG. 1. The method can be carried out at least partly by the monitor device 26 in particular.

In a step S10, a first nitrogen oxide value is detected upstream from the SCR catalyst 14. For example, the first nitrogen oxide value can be detected by the first nitrogen oxide sensor 28. In a step S12, a second nitrogen oxide value is detected downstream from the SCR catalyst 14, for example by means of the second nitrogen oxide sensor 30. The first and the second nitrogen oxide values may be detected in a temporal relation to each other, for example at the same time or within a predetermined time slot, and so forth. It is also possible that the first nitrogen oxide value and the second nitrogen oxide value are in each case nitrogen oxide values averaged over multiple individual measurements. In a step S14, a nitrogen oxide conversion of the SCR catalyst 14 can be calculated as the difference between the first nitrogen oxide value detected in step S10 and the second nitrogen oxide value detected in step S12, for example by the monitor device 26. For a given first nitrogen oxide value, the smaller the second nitrogen oxide value, the greater the calculated nitrogen oxide conversion.

In a step S16, a fluid quantity injected by the reducing agent injector 16 can be detected for example as a detected delivery quantity of the fluid pump 20. In a step S18, the composition of the fluid injected by the reducing agent injector 16 can be detected. In particular, the fluid sensor 32 can detect directly or indirectly how large the fraction of urea is in the fluid in the fluid tank 18. Based on the fluid quantity detected in step S16 and the fluid composition detected in step S18, it is possible to determine in a step S20 the reducing agent quantity injected by the reducing agent injector 16. In particular, it can be determined in step S20 how much ammonia ($NH_3$) has been formed by the injected quantity of aqueous urea solution in the exhaust gas line. As already mentioned, the possibility also exists of detecting the composition of the fluid not separately, but rather in a predetermined or estimated manner, for example, 32.5% pure urea in the aqueous urea solution in the fluid tank 18. Step S20 can be carried out by the monitor device 26, for example.

Expediently, the reducing agent quantity and the nitrogen oxide conversion have a temporal relation to each other, that is, they pertain for example to the same period of time of the monitoring.

In a step S22, the ratio between reducing agent quantity and nitrogen oxide conversion can be determined from the nitrogen oxide conversion as determined in step S14 and the reducing agent quantity as determined in step S20. For example, the ratio between reducing agent quantity and nitrogen oxide conversion can be calculated as the quotient of an ammonia quantity and a nitrogen oxide conversion (=ANR or ammonia to NOx ratio).

In step S24, it can be verified whether the determined ratio between reducing agent quantity and nitrogen oxide conversion from step S22 lies outside a predetermined permissible tolerance range. In particular, in step S24 it can be verified whether the determined ratio between reducing agent quantity and nitrogen oxide conversion from step S22 is greater than a predetermined limit value. For example, it can be verified whether the limit value has been crossed for a predetermined period of time. The background for step S24 is the fact that the determined nitrogen oxide conversion will decrease when an ammonia slip increases. The reason for this is that the second nitrogen oxide sensor 30, which is cross sensitive to ammonia, puts out a larger second nitrogen oxide value when ammonia slip occurs. If the nitrogen oxide conversion decreases, the quotient formed from the reducing agent quantity and the nitrogen oxide conversion becomes larger. The permissible tolerance range or limit value is chosen such that, when crossed, it can be assumed that ammonia slip is occurring to a degree that should be responded to.

If the determined ratio between reducing agent quantity and nitrogen oxide conversion per step S24 lies within the predetermined permissible tolerance range (+), the monitoring may be continued with steps S10, S12, S16 and S18. On the other hand, if the determined ratio between reducing agent quantity and nitrogen oxide conversion per step S24 lies outside the predetermined permissible tolerance range (−), it is determined that an ammonia slip condition is present. Further measures may be instituted in response to this in step S26.

For example, in step S26 measures may be instituted to lessen the ammonia slip. In particular, a fluid quantity injected by the reducing agent injector 16 can be decreased. It is possible, based on the determined ratio between reducing agent quantity and nitrogen oxide conversion, to make an estimate of the extent of the ammonia slip occurring. Based on the estimate, the appropriate countermeasure can be taken, for example to lessen the ammonia slip. After instituting the measures in step S26, the method may proceed, for example with steps S10, S12, S16 and S20.

The disclosure is not limited to the exemplary embodiments described above. Instead, many variants and modifications are possible, which likewise make use of the notion of the inventive concept and therefore come within its protective scope.

LIST OF REFERENCE SYMBOLS

A Exhaust gas
10 Exhaust gas after-treatment system
12 SCR exhaust gas after-treatment device
14 SCR catalyst
16 Reducing agent injector
18 Fluid tank
20 Fluid pump
22 Oxidation catalyst
24 Particle filter
26 Monitor device
28 First nitrogen oxide sensor
30 Second nitrogen oxide sensor
32 Fluid sensor

What is claimed is:

1. A method for monitoring an SCR exhaust gas after-treatment device, comprising:
   detecting of a first nitrogen oxide value in the exhaust gas upstream from an SCR catalyst of the SCR exhaust gas after-treatment device;
   detecting of a second nitrogen oxide value in the exhaust gas downstream from the SCR catalyst, wherein the second nitrogen oxide value is detected with a cross sensitivity to ammonia;
   determining of a nitrogen oxide conversion as the difference between the first nitrogen oxide value and the second nitrogen oxide value;
   monitoring of a ratio between a reducing agent quantity and the nitrogen oxide conversion of the SCR exhaust gas after-treatment device; and
   determining of an ammonia slip condition based on the monitored ratio between reducing agent quantity and nitrogen oxide conversion.

2. The method according to claim 1, wherein the ratio is between ammonia quantity and nitrogen oxide conversion.

3. The method according to claim 1, wherein:
   the ammonia slip condition is determined if the ratio between the reducing agent quantity and the nitrogen oxide conversion is outside a permissible range or a predetermined range; or
   an ammonia slip condition is determined if the ratio between the reducing agent quantity and the nitrogen oxide conversion is outside a permissible range or a predetermined range, for a predetermined time.

4. The method according to claim 1, wherein:
   an ammonia slip condition is determined if the ratio between the reducing agent quantity and the nitrogen oxide conversion is greater than a predetermined limit value; or
   an ammonia slip condition is determined if the ratio between the reducing agent quantity and the nitrogen oxide conversion is greater than a predetermined limit value for a predetermined time.

5. The method according to claim 1 further comprising:
   determining or estimating an ammonia slip quantity based on the monitored ratio between the reducing agent quantity and the nitrogen oxide conversion.

6. The method according to claim 1, wherein:
   the reducing agent quantity is detected or determined based on a detection of a composition of a fluid supplied or being supplied to a reducing agent injector for injection.

7. The method according to claim 6, wherein:
   the reducing agent quantity is an ammonia quantity and the fluid is an aqueous urea solution.

8. The method according to claim 7, wherein:
   a water fraction, a water content, a urea fraction or a urea content of the fluid is detected; or
   the detection of the composition occurs in a fluid tank.

9. The method according to claim 1, wherein:
   the reducing agent quantity is detected or determined based on a detection of a fluid quantity of a fluid supplied to or injected into a reducing agent injector for injection.

10. The method according to claim 9, wherein:
    the reducing agent quantity is an ammonia quantity and the fluid is an aqueous urea solution.

11. The method according to claim 9, wherein
    the detection of the fluid quantity is done by means of detection of an operating parameter of a fluid pump, by means of detection of an operating parameter of the reducing agent injector, by means of a flow rate sensor or by means of a fill level sensor of a fluid tank.

12. The method according to claim 1, wherein:
    the reducing agent quantity is determined based on a pump speed of a fluid pump, a delivery pressure of the fluid pump and an opening time of a reducing agent injector.

13. The method according to claim 1, further comprising:
    introducing of measures to lessen an ammonia slip if the ammonia slip condition has been determined; or
    decreasing of an injected reducing agent quantity or a quantity to be injected if the ammonia slip condition has been determined.

14. A device for exhaust gas after-treatment comprising:
    a reducing agent injector;
    an SCR catalyst, which is arranged downstream from the reducing agent injector;
    a first nitrogen oxide sensor, situated upstream from the SCR catalyst and detecting a first nitrogen oxide value;
    a second nitrogen oxide sensor, situated downstream from the SCR catalyst and detecting a second nitrogen oxide value with a cross sensitivity to ammonia; and
    a monitor device in communication with the first and second nitrogen oxide sensors to receive the first and second nitrogen oxide values, the monitor device configured to determine a nitrogen oxide conversion as the difference between the first nitrogen oxide value and the second nitrogen oxide value, and further configured to monitor a ratio between a reducing agent quantity and the nitrogen oxide conversion, and further configured to determine an ammonia slip condition based on the monitored ratio between the reducing agent quantity and the nitrogen oxide conversion.

15. The device according to claim 14, further comprising:
    a first fluid sensor for detecting a composition of a fluid supplied or to be supplied to the reducing agent injector for injection; and
    a second fluid sensor for detecting a fluid quantity of a fluid supplied or to be supplied to the reducing agent injector for injection;
    wherein the monitor device determines the reducing agent quantity based on the detected composition and the detected fluid quantity.

16. The device according to claim 14, wherein:
    the reducing agent quantity is an ammonia quantity.

17. A motor vehicle having the device according to claim 14.

* * * * *